Patented Dec. 10, 1935

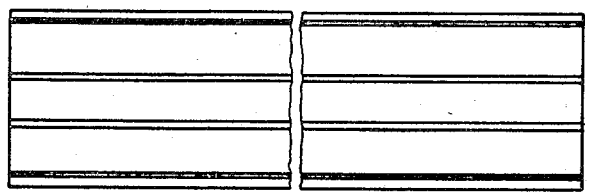
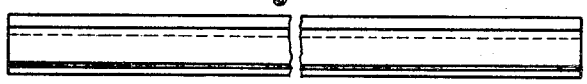
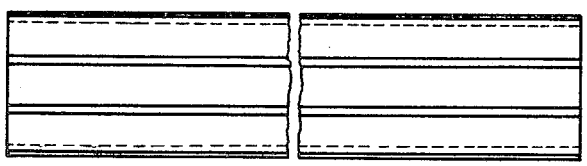
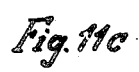
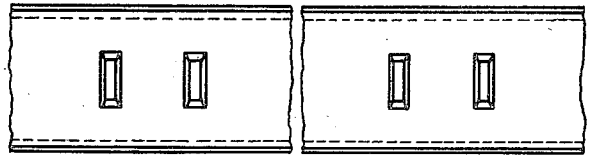
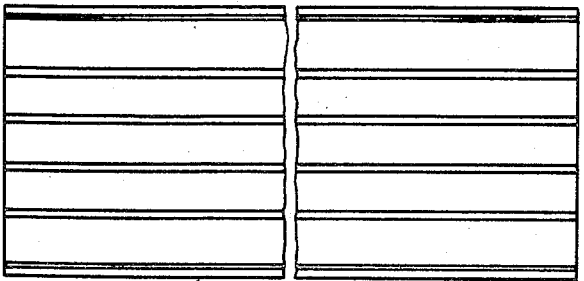

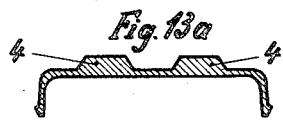
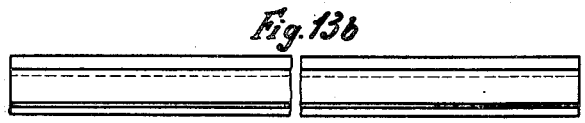
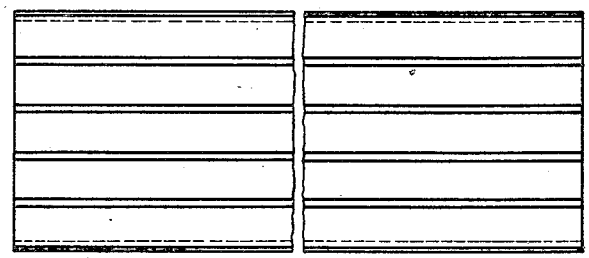
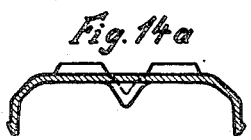
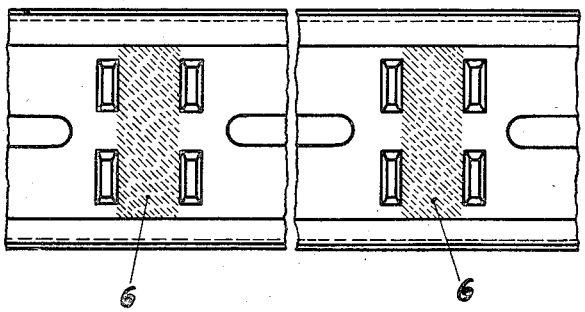
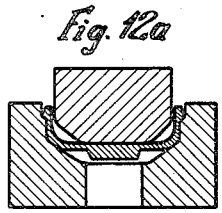
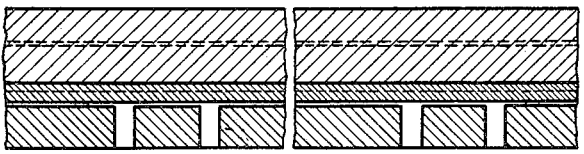
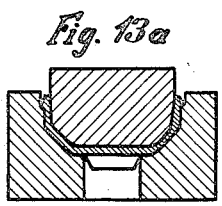
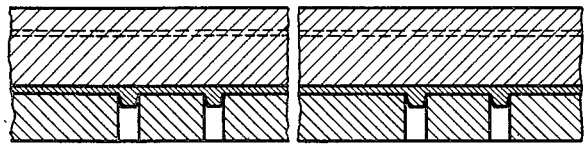

2,023,827

UNITED STATES PATENT OFFICE

2,023,827

PROCESS FOR THE PRODUCTION OF IRON SLEEPERS

Carl Wallmann, Julius Grossweischede, and Bernhard Kruse, Mulheim-Ruhr, Germany, assignors to the firm Vereinigte Stahlwerke Aktiengesellschaft, Dusseldorf, Germany Application January 28, 1932, Serial No. 589,466 In Germany February 10, 1931

11 Claims. (Cl. 29—169)

The present invention relates to a process for the production of iron sleepers with engaging ribs or projections.

The hitherto used railway sleepers with welded rib-plates have the disadvantage that the welding-on of the rib-plates produces disadvantageous changes in the texture of the sleeper at the place which is subjected to the greatest stress.

A further disadvantage is the low margin of safety caused first by the fact that the sleeper consists of two parts and secondly by the fact that connection by welding cannot be relied upon absolutely. The present invention is intended to eliminate these disadvantages.

According to the process of the present invention this is obtained by the fact that the rail engaging rib-plates or rib-projections are produced by changing the shape of the sleeper. To this end the rib-plates or rib-projections are forced by forging, stamping, or pressing in one and the same process as the manufacture of the sleeper itself. Describing the process in detail, the present invention can be carried into effect by taking as raw material a flat iron or iron profile, the thickness of which corresponds approximately to the height of the ribs or rib-plates, while during the pressing itself the superfluous material is pushed sideways for the purpose of forming and widening the body proper of the sleeper. As a starting material for the sleeper one can use either rolled flat iron of the previously mentioned thickness or a correspondingly dimensioned iron profile, which, in its middle part, is sufficiently thicker to provide enough material for the formation of the rib-plates or rib-projections. In order to lessen the pressing or forging process this rolled cross section can have a longitudinal groove in its central thicker part.

Besides this, the new process presents also the possibility of re-inforcing in a simple way the sleeper where the rails will lie, i. e. there where the greatest stresses will occur, and further, in the case of double sleepers, of letting the surface on which the rails will lie extend across the whole sleeper, so that the rail ends have a complete support right to the butt.

The drawings illustrate, by way of an example, one form of application of the invention.

Figures 9a to 10c are cross sections, side views and plan views of different further raw material for producing a single sleeper.

Figures 11a to 11c are cross sections, side views and plan views of a finished sleeper.

Figures 12a to 13b are diagrammatic illustrations of the pressing process itself.

In the sleeper 1 the rail-contact part 2 is pressed so that it is thicker while at the same time the rib-projections 3 are pressed, forged or stamped while the surplus material is pushed sideways.

Figure 1:
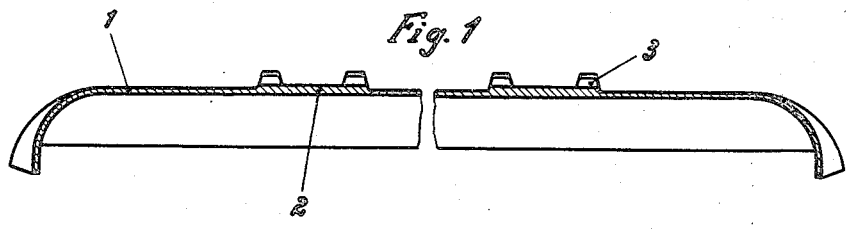
Figure 1 shows an iron sleeper produced according to the present invention, in longitudinal section.
Figure 2:
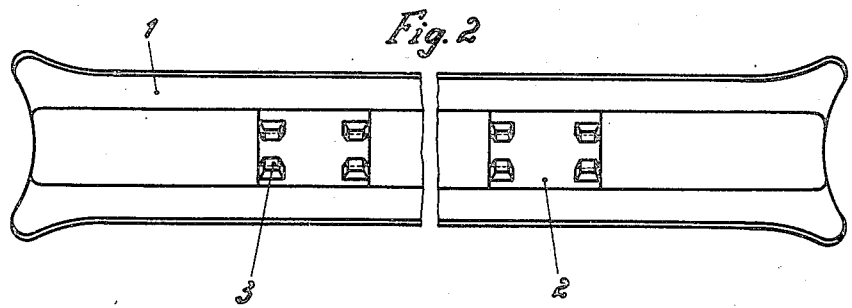
Figure 2 shows the same sleeper in plan view.
Figure 3:
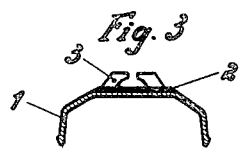
Figure 3 shows it in cross section.
Figure 4:
Figures 4 to 8 are cross sections of the different shapes of flat or angle iron which can be used as raw material.

Figure 4 shows, as raw material, a flat iron from which the sleeper with its rib-plates or rib-projections is stamped in one only working process.

Figure 5:
Figure 6:
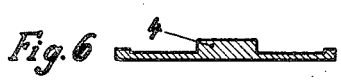

Figures 5 and 6 show suitably shaped rolled irons which have a thicker central part 4.

Figure 7:
Figure 8:

In Figures 7 to 8 this thicker part is provided with a central longitudinal groove 5 in order to reduce the pressing and forging work as much as possible.

Figures 9a to 9c show a further shaped flat iron which is suitable for producing single sleepers. According to Figures 10a to 10c the raw material consists of a rolled shaped iron which, during the rolling process, is already given a shape somewhat nearer the final shape of the sleeper. Figures 11a to 11c show a finished sleeper in cross section, side view and plan view. According to Figures 12a and 12b show a piece in process of being worked, according to Figures 10a to 10c, in the press forge before the pressing operation begins, while Figures 13a and 13b show the press forge during the operation. During the pressing operation the rib-projections of the shaped part of the rolled iron are stamped and pressed out, while at the same time the longitudinal thicker part of the shaped rolled iron is pressed down and the latter is shaped from the cross section shown in Figure 10a into the cross section shown in Figure 11a which measures about 60 m/m more. The middle part of the sleeper is thereby given a strength such as is not obtained in the usual pattern of standard sleepers. The ratio of the distance for which the ribs are driven up into the lower die (Figures 13a and 13b) is about 25%.

What we claim and desire to secure by Letters Patent is:—

1. Process for the production of iron sleepers with rail engaging projections, consisting in forcing an even preliminary profile in a die so as to change the shape of this profile into the final shape of the sleeper with the said projections.

2. Process for the production of iron sleepers with rail engaging ribs, consisting in forcing an even preliminary profile in a die so as to change the shape of this profile into the final shape of the sleeper with the said ribs.

3. Process for the production of iron sleepers with rail engaging projections, consisting in forming an even preliminary profile having a less breadth than the completed sleeper and then forcing out sideways the material not required for the projections so as to produce the desired breadth of the sleeper.

4. Process for the production of iron sleepers with rail engaging projections, consisting in rolling an even preliminary profile having at least one continuous longitudinal rib and forming the final shape of the sleeper and its projections in a single operation by pressing the preliminary profile in a die.

5. Process for the production of iron sleepers with rail engaging projections, consisting in rolling a flat profile, the thickness of which being equal to the height of the projections to be produced while the breadth is less than that of the final sleeper, and forcing the flat profile in a die so as to spread out the material and form the final shape of the sleeper and its projections.

6. Process for the production of iron sleepers with rail engaging projections, consisting in rolling a preliminary profile having a thickened longitudinal ridge portion extending over the entire length of the profile and having a central longitudinal groove and then changing the shape of the profile by pressing it in a die so as to form the final sleeper and its projections at the desired places.

7. Process for the production of iron sleepers with rail engaging projections, consisting in changing the shape of an even preliminary profile having at least one continuous longitudinal rib, the thickness of which being equal to the height of the projections to be produced while the breadth is less than that of the final sleeper, by forcing the said profile in a die so as to spread out the material not required for the projections to the desired breadth of the sleeper.

8. Process for the production of iron sleepers with rail engaging projections, consisting in changing the shape of an even preliminary profile by pressing in a die to form the final shape of the sleeper with projections and thickened portions where the rails are supported.

9. Process for the production of iron sleepers with rail engaging projections, consisting in changing the shape of an even preliminary profile by pressing in a die to form the final shape of the sleeper with projections and thickened portions, the latter extending across the sleeper where the rails are supported.

10. Process for the production of iron sleepers with rail engaging projections, consisting in changing the shape of an even preliminary profile by pressing in a die to form the final shape of the sleeper with integral projections for engaging opposite sides of the rails and integral thickened portions on which the rails rest, the said projections and thickened portions being at the upper surface of the sleeper.

11. Process for the production of iron sleepers with rail engaging projections, consisting in rolling a preliminary profile having spaced longitudinal ribs and then changing the shape of the profile by pressing it in a die so as to form the final sleeper and its projections at the desired places.

CARL WALLMANN.
JULIUS GROSSWEISCHEDE.
BERNHARD KRUSE.